2,879,546
SILICA EXTRUSIONS

Adley W. Hemphill, Glen Burnie, Md., assignor to W. R. Grace & Co., New York, N.Y., a corporation of Connecticut No Drawing. Application August 29, 1955
Serial No. 531,298

5 Claims. (Cl. 18—47.5)

This invention relates generally to extrusions and particularly to silica gel extrusions. In one specific aspect, it relates to the preparation of an extruded silica-supported catalyst.

Heretofore most methods of preparing silica-containing extrusions have involved the use of a binding agent or the addition of dried material to the silica-containing mass prior to extrusion. It has been suggested that sodium silicate may be added to a mass of dried powdery silica gel and that this mass may be pressed into shaped particles. The subsequent addition of a suitable reagent forms a binding agent within the silica-containing mass. Admittedly, the reagent may be added before, during, or after the time that the mass is formed into the desired shape. The obvious disadvantage of this process is the fact that it necessitates a subsequent leaching process to remove the impurities formed during the preparation of the binding agent. This leaching process would result in considerable decrepitation of the formed particles. In U.S. Patent 2,724,701 of Casimer C. Legal, Jr., it is disclosed that a silica hydrogel can be converted to a sol by heating in a closed vessel at elevated temperatures and pressures. While it is thus known that silica hydrogel can be reverted to a hydrosol, no advantage is taken of this special property in the preparation of extrusions. The present invention offers substantial improvement in this respect.

It is therefore an object of the present invention to produce a silica gel extrusion or an extruded silica-supported catalyst without the use of a binding agent.

The present invention is predicated on the knowledge that it is possible to effect reversion of silica hydrogel to its hydrosol. By the application of heat before or during extrusion it is possible to effect a partial reversion of hydrogel to hydrosol. Subsequently, setting of the hydrosol to the hydrogel forms new structural linkages within the hydrogel mass which are sufficiently strong to act as binding agents during extrusion. The hydrosol will also serve as a lubricating aid during the extrusion process. The partial reversion is accomplished by heating the hydrogel mass before or during the extrusion operation to elevated temperatures below the boiling point of water at the operating pressure. Care must be taken to avoid such temperatures and pressures as will cause the hydrogel to completely revert to a liquid mass.

The temperatures and pressures to be used will depend on the alkalinity of the hydrogel and the length of time the heat is applied to this hydrogel. If the heating of the hydrogel mass is accomplished prior to extrusion, there is more time available; hence partial reversion will occur at a lower temperature. Higher temperatures and therefore higher pressures (to maintain non-evaporative conditions) must be employed if heat is to be applied during the extrusion process. As the alkalinity of a hydrogel increases the temperature at which reversion begins to occur is decreased.

Silica gel extrusions of uniform appearance and physical properties can be prepared by heating silica hydrogel before or during extrusion under non-evaporative conditions to an elevated temperature to cause a partial reversion of the hydrogel to a hydrosol. The hydrosol, which aids in the lubrication of the mass during extrusion, subsequently reconverts to a hydrogel to form new structural linkages which serve to bind the hydrogel mass after it has been formed into shaped particles. The resultant extrusion is then dried to the desired moisture content.

This process is equally applicable to compositions containing a substantial proportion of silica hydrogel such as silica alumina hydrogel and various silica-supported catalysts.

The present invention will be further illustrated by the following example:

A washed alkaline hydrogel was ground through 100 mesh (U.S. sieves) and blended with a catalytic medium. This hydrogel mass was passed through a screw-type steam jacketed extruder. The steam was fed to the jacket of the extruder at a pressure of about 10 pounds per square inch gage resulting in a jacket temperature of about 240° F. A small amount of water was added to the gel prior to passing it through the extruder to provide additional lubrication and to compensate for any loss water caused by evaporation. The resultant extrusion which was consistent in appearance and physical properties, was then dried to the desired total volatile content. The physical properties of the resultant dried extrusion are summarized in the following table:

| Diameter, Inches | Total Volatile Matter, percent | Adsorption gm. H₂O/gm. SiO₂ at Relative Humidity, percent | | | | | Pill Strength, lbs. | | |
|---|---|---|---|---|---|---|---|---|---|
| | | 10 RH | 20 RH | 40 RH | 60 RH | 80 RH | Avg. | Max. | Min. |
| ⅛ | 4.69 | 0.77 | 3.25 | 6.71 | 11.72 | 33.31 | 4.6 | 8.0 | 2.0 |

As an alternative to the technique hereinbefore suggested, the hydrogel mass may be pre-heated before it is passed through the extruder. Under non-evaporative conditions, temperatures in the range of 175° F. to 390° F. are sufficient to accomplish partial reversion of the hydrogel to a hydrosol.

From the foregoing disclosure, it should be readily understood that the present invention obviates entirely the use of a binding agent. It produces relatively hard extrusions of uniform appearance and physical properties.

I claim:

1. A method for preparing consistent silica extrusions without the use of external agents having any binding and plasticizing effects which comprises passing a mass of alkaline silica hydrogel into a heated extruder maintained under non-evaporative conditions and at a temperature of about 175° F. to 390° F. for a period of time sufficient only to induce partial reversion of the hydrogel to a hydrosol, and forcing said mass through said extruder to form shaped particles thereof, and resetting to the hydrogel the hydrosol which is formed during the partial reversion step and thereby forming new structural linkages within the extrudate.

2. A method for preparing relatively hard silica extrusions of uniform appearance without the use of external agents having any binding and plasticizing effects which comprises heating a mass of alkaline silica hydrogel at an elevated temperature but below the boiling point of water at the operating pressure for a period of time sufficient only to induce partial reversion of the hydrogel to a hydrosol, extruding the heated mass to form shaped particles thereof, and resetting to the hydrogel the hydrosol which is formed during the partial reversion step and thereby forming new structural linkages within the extrudate.

3. A method for preparing relatively hard silica extrusions of uniform appearance and physical properties without the use of external agents having any binding and plasticizing effects which comprises passing a mass of alkaline silica hydrogel into a heated extruder maintained at an elevated temperature but below the boiling point of water under superatmospheric conditions for a period of time sufficient to induce partial reversion of the hydrogel to a hydrosol, extruding the heated mass to form shaped particles thereof, resetting to the hydrogel the hydrosol which is formed during the partial reversion step and thereby forming new structural linkages within the extrudate, and drying the resulting extrudate.

4. A method according to claim 1 wherein the mass of silica hydrogel is composited with a catalytic medium and said composite is extruded and dried.

5. A method for preparing a relatively hard extruded silica-supported catalyst without the use of external agents having any binding and plasticizing effects which comprises forming a mass of silica hydrogel and a catalytic medium, passing said mass through a heated extruder maintained at a temperature of about 240° F. and a pressure of about 10 p.s.i.g. and thereby cause partial reversion of the hydrogel to a hydrosol, forcing said mass through said extruder to form shaped particles thereof, and resetting to the hydrogel the hydrosol which is formed during the partial reversion step and thereby forming new structural linkages within the extrudate.

References Cited in the file of this patent
UNITED STATES PATENTS

| | | |
|---|---|---|
| 2,097,634 | Malan et al. | Nov. 2, 1937 |
| 2,386,810 | Marisic et al. | Oct. 16, 1945 |
| 2,604,662 | Bodkin | July 29, 1952 |
| 2,724,701 | Legal | Nov. 22, 1955 |
| 2,754,547 | Allen | July 17, 1956 |